United States Patent
Amonkar et al.

(10) Patent No.: US 12,530,475 B2
(45) Date of Patent: Jan. 20, 2026

(54) SYSTEM AND METHOD FOR OBJECT RECOGNITION AND PRIVACY PRESERVATION

(71) Applicant: Fractal Analytics Private Limited, Mumbai (IN)

(72) Inventors: Suraj Amonkar, Mumbai (IN); Abhishek Chopde, Khamgaon (IN); Prankur Rusia, Bhilai (IN); Kunal Singh, Kolkata (IN); Mohnish Raju Jain, Mumbai (IN); Souvik Mandal, Bankura (IN)

(73) Assignee: Fractal Analytics Private Limited, Mumbai (IN)

( * ) Notice: Subject to any disclaimer, the term of this patent is extended or adjusted under 35 U.S.C. 154(b) by 690 days.

(21) Appl. No.: 17/711,305

(22) Filed: Apr. 1, 2022

(65) Prior Publication Data

US 2023/0252173 A1    Aug. 10, 2023

(30) Foreign Application Priority Data

Feb. 10, 2022    (IN) .............................. 202221007216

(51) Int. Cl.
| | |
|---|---|
| *G06F 21/62* | (2013.01) |
| *G06N 3/045* | (2023.01) |
| *G06N 3/088* | (2023.01) |
| *H04L 9/06* | (2006.01) |
| *H04L 9/30* | (2006.01) |

(52) U.S. Cl.
CPC ......... *G06F 21/6209* (2013.01); *G06N 3/045* (2023.01); *G06N 3/088* (2013.01); *H04L 9/0631* (2013.01); *H04L 9/302* (2013.01)

(58) Field of Classification Search
CPC .... G06F 21/6209; G06N 3/045; G06N 3/088; H04L 9/0631; H04L 9/302
See application file for complete search history.

(56) References Cited

U.S. PATENT DOCUMENTS 7,463,736 B2 * 12/2008 Tagashira .............. H04L 9/0836
380/216
11,423,265 B1 * 8/2022 Chen ....................... G06T 11/00
(Continued)

FOREIGN PATENT DOCUMENTS

KR        101936802 B1       1/2019

*Primary Examiner* — Theodore C Parsons
*Assistant Examiner* — Alan L Kong
(74) *Attorney, Agent, or Firm* — Wiley Rein LLP (57) ABSTRACT

Systems and methods are provided for detecting an object region in an image and encrypting/decrypting a detected object region. The system comprises three main components: a database server, a data analytics system and a standard dashboard. The database server may further comprise a distributed database server and a key store database server. The data analytics system is executed by a computer processor configured to apply a multi-head self-supervised learning-based classifier to detect object information captured by the image. The data analytics system further comprise a privacy processing component that is configured to selectively encrypt the detected object using an encryption key following the advanced encryption standard with cipher block chaining mode (AES-CBC).

16 Claims, 5 Drawing Sheets

(56) References Cited

U.S. PATENT DOCUMENTS

| | | | | |
|---|---|---|---|---|
| 2007/0150962 | A1* | 6/2007 | Hayashi | H04N 1/4486 |
| | | | | 726/27 |
| 2021/0203886 | A1* | 7/2021 | Byrne | H04N 21/2187 |
| 2021/0319266 | A1* | 10/2021 | Chen | G06V 10/764 |
| 2022/0012366 | A1* | 1/2022 | Burceanu | G09C 5/00 |
| 2022/0156587 | A1* | 5/2022 | Ebrahimpour | G06N 3/08 |
| 2022/0358332 | A1* | 11/2022 | Joze | G06F 18/2148 |
| 2023/0034040 | A1* | 2/2023 | Luo | G06V 10/778 |
| 2023/0113643 | A1* | 4/2023 | Mittal | G06F 16/75 |
| | | | | 382/159 |
| 2024/0054637 | A1* | 2/2024 | Parkinson | G06T 7/0012 |
| 2024/0152749 | A1* | 5/2024 | Shanahan | G06N 3/08 |

* cited by examiner

SYSTEM AND METHOD FOR OBJECT RECOGNITION AND PRIVACY PRESERVATION

RELATED APPLICATIONS

This application claims priority benefit of Indian Patent Application No. 202221007216, filed Feb. 10, 2022, which are incorporated entirely by reference herein for all purposes.

FIELD

The present disclosure relates generally to image processing, and more specifically to systems and methods of securely protecting or storing personal information in image or video data based on object recognition followed by image encryption.

BACKGROUND ART

Remote surveillance is common for security, law enforcement, intelligence, and military purposes. For example, shopping centers, police stations, and other facilities catering to the public often have closed-circuit television (CCTV) cameras/digital video recorder (DVR) or other devices monitoring members of the public in the facility. In one example, pole-mounted cameras have been used for traffic enforcement. In another example, drones are increasingly used for surveillance purpose. Drones can be used to carry out surveillance or intelligence-gathering missions using a variety of optical or other sensors, permitting those sensors to interact with their environments in order to collect data.

Due to the increasing installation of CCTV/DVR based video surveillance system to collect various image information even at a long distance through high image quality and high magnification, there is a urgent need of implementing privacy preservation measures to protect the rights of people to be free from surveillance without cause, especially when the surveillance is being carried out by a small, unobtrusive drone. This need can also pertain to surveillance carried out by fixed cameras such as security or traffic cameras.

In order to protect the privacy of individuals, in recent privacy regulations, when providing video information such as CCTV/DVR, it is required to perform mosaic processing of the other person's image. Various methods for protecting personal information in CCTV/DVR have been developed. See KR101936802. But a satisfactory automated method for this has not been developed.

Therefore, there is still a need for an improved technology platform and computer network implemented method to analyze image or video data to achieve high accuracy of detection as well as secure privacy protection.

SUMMARY OF THE INVENTION

In view of the foregoing, the present invention provides an artificial intelligence-based system and method for object recognition and privacy preservation.

The present invention describes a system and a method of detecting an object region based on an object recognition technique in video image information recorded/stored in a video surveillance system such as a CCTV/DVR, and then selectively extracts an object image with pre-defined features. A image encryption is performed to prevent leakage of individual personal information.

According to one aspect of the present invention, the present system comprises an object detection component for detecting an object region in each of the image frames. In another aspect, the object detection component may designate a detected object region with pre-defined features to be encrypted. The pre-defined features may include, but not limited to, gender, ages (young or adult), clothing, hat that are used to identify a certain person. The present system further comprises a privacy processing component for encrypting/decrypting the detected object region.

In some embodiments, the object detection component may detect an object region by using a multi-head self-supervised learning neural network-based classifier techniques and distinguish the object from the target object to be searched and designed the detected object region to be encrypted.

An aspect of the present invention provide an object detection component for identifying an object region in an image and outputting a detected object region to be encrypted. This component is executed by a computer processor configured to apply object detection and classification and deep learning algorithms to detect object information in the image.

The present invention provides a multi-head self-supervised-learning-based classifier that consists of two main parts: a single base convolutional encoder that is pre-trained using contrastive loss to extract object features over the whole input image, and multiple projection heads layers to map the features to the space where contrastive loss is applied. The single base encoder is trained using a self-supervised learning technique and is common for all classification tasks. Multiple projection heads may be used to perform object detection and feature recognition in objects of variant distances in an image.

In some embodiments, an encoder neural network is pre-trained to extract global image representations that are useful for downstream tasks, including objection classification, and constitutes a good initialization that can be fine-tuned into an accurate model. Contrastive learning enforces representations to be similar for similar pairs and dissimilar for dissimilar pairs. After training, the encoder weights are frozen so that they are constant. Subsequently, for each object classification, a projection head network is attached to the encoder output and is trained on labelled images. Multiple heads are attached to the encoder and trained for that specific task. Each projection head would not communicate with each other.

The encoder network may be various choices of the network architecture without any constraints. In some embodiments, the encoder network may be ResNet, AlexNet, VGGNet, Inception network or any other generalized neural network as the backbone. The projection head may be a multilayer perceptron (MLP). As the contrastive loss, normalized temperature-scaled cross-entropy loss (NT-Xent) may be applied.

In some embodiments, this invention provides a data augmentation module that transforms any given data randomly resulting in two correlated views of the same example, which are considered as a positive pair. The augmentation module may comprise cropping and resizing, rotation and cutout, color distortions, Gaussian blur, and Sobel filtering.

Having one encoder for multiple projection heads would keep the weight file size almost constant even with growing heads. As each projection head would have a smaller number of parameters and is very easily replaceable, the system will be much more memory and time efficient. Data requirement can be reduced by 90%. Further, data annotation was reduced by 90% by using active learning. Computational overhead is reduced by x N (where N is the number of classifiers/heads). Accuracy would be boosted compared to the ImageNet counterpart. Further, the system is very cost-effective. The accuracies of the system are more stable over a period of time.

In some embodiments, the privacy processing component may selectively encrypt the detected object using an encryption key following the advanced encryption standard with cipher block chaining mode (AES-CBC). The privacy processing component comprises an AES key generator, an AES encryption block, and a Rivest-Shamir-Adleman (RSA) key-pair module. The AES key generator is configured to generate a random AES key. The AES encryption block takes an image with the detected object and the AES key and then produces an encrypted image output. The RSA key-pair module is configured to generate a public key that is used to encrypt the AES key. In another embodiment, the encrypted data is transmitted and stored in a large scale distributed database server so that even in the incidents like thievery or hacking individual privacy would not be compromised. Still in another embodiment, the encrypted AES key is transmitted and stored in a key store database with limited access.

In another aspect of the invention, the privacy processing component further comprises a decipher block configured to receive decipher request and to decrypt the encrypted data using the same AES key. The RSA key-pair module is configured to generate a private key for AES key recovery. The encrypted data stored in the database will be unmasked and will only be visible for a session with predefined expiry timelines.

In some embodiment, when the object detection component designates a plurality of detected object regions to be encrypted, the privacy processing component may encrypt the image of the respective areas of the plurality of designated object regions to be encrypted individually using a plurality of encryption keys. The image of each designated object region to be encrypted is encrypted using a separate encryption key, thereby increasing the strength of security. Still in another embodiment, the privacy processing component may encrypt the image of the respective areas of the plurality of designated object regions to be encrypted all at once using one encryption key.

One embodiment may provide a system for detecting an object region in an image and encrypting/decrypting a detected object region, comprising:
  a database server executed by one or more storage devices;
  a data analytics system comprising one or more convolutional neural networks and a privacy processing component; and
  a standard dashboard;
  wherein the data analytics system comprises a non-transitory computer-readable medium and instructions that when executed by the non-transitory computer-readable medium cause the non-transitory computer-readable medium to perform at least one operation from the group consisting of:
    receiving an input unlabeled image, via an application programming interface from a recording device or an external database;
    generating, via an augmentation module of the data analytics system, an augmented unlabeled image;
    training an encoder neural network of the data analytics system with the augmented unlabeled image to extracts object features and generate an output labeled image that labels the object region;
    training a plurality of projection heads with the output labeled image to map features to a space where contrastive loss is applied and to classify the detected objection region to be a human object region or a non-human object region;
    designating the human object region with pre-defined features to be encrypted;
    generating, via an advanced encryption standard (AES) key generator, an AES key
    encrypting, via an AES encryption block, a designated human object region using the AES key;
    generating, via a Rivest-Shamir-Adleman (RSA) key-pair module, a public RSA key;
    encrypting, via the RSA key-pair module, the AES key with the RSA public key;
    outputting an encrypted image and storing the encrypted image in a large scale distributed database server;
    outputting an encrypted AES key and storing the encrypted AES key in a key store database server; and
    decrypting, via a decipher block, the encrypted image upon receiving a request from a user.

An additional embodiment herein provides a method for detecting an object region in an image and encrypting/decrypting a detected object region, comprising
  receiving an input unlabeled image, via application programming interface from a recording device or an external database;
  generating, via an augmentation module of the data analytics system, an augmented unlabeled image;
  training an encoder neural network of the data analytics system with the augmented unlabeled image to extracts object features and generate an output labeled image that labels the object region;
  training a plurality of projection heads with the output labeled image to map features to a space where contrastive loss is applied and perform classification and to classify the detected objection region to be a human object region or a non-human object region;
  designating the human object region with pre-defined features to be encrypted;
  generating, via an advanced encryption standard (AES) key generator, an AES key
  encrypting, via an AES encryption block, a designated human object region using the AES key;
  generating, via a Rivest-Shamir-Adleman (RSA) key-pair module, a public RSA key;
  encrypting, via the RSA key-pair module, the AES key with the RSA public key;
  outputting an encrypted image and storing the encrypted image in a large scale distributed database server;
  outputting an encrypted AES key and storing the encrypted AES key in a key store database server; and
  decrypting, via a decipher block, the encrypted image upon receiving a request from a user.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Deep learning" refers to a subfield of machine learning concerned with algorithms inspired by the structure and function of the brain called artificial neural networks.

"Convolutional neural network (CNN)" a class of deep neural networks, most commonly applied to analysing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

"Recurrent neural network (RNN)" is a class of artificial neural networks where connections between nodes form a directed graph along a temporal sequence. This allows it to exhibit temporal dynamic behaviour. Unlike feedforward neural networks, RNNs can use their internal state (memory) to process sequences of inputs. This makes them applicable to tasks such as unsegmented, connected handwriting recognition or speech recognition.

"Artificial neural networks (ANN)" or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analysing example images that have been manually labelled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

A "multilayer perceptron (MLP)" is a class of feedforward artificial neural network (ANN). The term MLP is used ambiguously, sometimes loosely to refer to any feedforward ANN, sometimes strictly to refer to networks composed of multiple layers of perceptrons (with threshold activation). Multilayer perceptrons are sometimes colloquially referred to as "vanilla" neural networks, especially when they have a single hidden layer.

"Unsupervised machine learning (ML)" refers to unsupervised machine learning algorithms that gather patterns from a dataset without reference to known, or labelled outcomes.

"Upsample" refers to any technique that usamples image to a higher resolution.

"Application programming interface (API)" is an interface or communication protocol between different parts of a computer program intended to simplify the implementation and maintenance of software.

"Decision-tree" is a decision support tool that uses a tree-like model of decisions and their possible consequences, including chance event outcomes, resource costs, and utility. It is one way to display an algorithm that only contains conditional control statements.

"Microservice" are a software development technique—a variant of the service-oriented architecture (SOA) structural style—that arranges an application as a collection of loosely coupled services. In a microservices architecture, services are fine-grained and the protocols are lightweight.

"Support-vector machines (SVM)" are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on the side of the gap on which they fall.

"Pseudo labels" are automatically generated labels based on data attributes for pretext tasks.

"Pretext tasks" are pre-designed tasks for networks to solve, and visual features are learned by learning objective functions of pretext tasks.

"Downstream tasks" are computer vision applications that are used to evaluate the quality of features learned by self-supervised learning. These applications can greatly benefit from the pretrained models when training data are scarce. In general, human-annotated labels are needed to solve the downstream tasks. However, in some applications, the downstream task can be the same as the pretext task without using any human-annotated labels.

"Self-supervised Learning" is a subset of unsupervised learning methods. Self-supervised learning refers to learning methods in which ConvNets are explicitly trained with automatically generated labels.

"Residual neural network (ResNet)" is an artificial neural network (ANN) of a kind that builds on constructs known from pyramidal cells in the cerebral cortex. Residual neural networks do this by utilizing skip connections, or shortcuts to jump over some layers.

"AlexNet" is the name of a convolutional neural network (CNN), designed by Alex Krizhevsky. The architecture consists of eight layers: five convolutional layers and three fully-connected layers.

"VGGNet" is invented by Visual Geometry Group (by Oxford University). It makes the improvement over AlexNet by replacing large kernel-sized filters (11 and 5 in the first and second convolutional layer, respectively) with multiple 3×3 kernel-sized filters one after another.

"Inception Network" is a type of convolutional neural network classifiers.

Common Objects in Context (COCO) is one of the most common large-scale image datasets for the evaluation of state-of-the-art computer vision models. COCO dataset contains image annotations in 80 categories, with over 1.5 million object instances.

"Visdrone dataset" is collected by the AISKYEYE team at Lab of Machine Learning and Data Mining, Tianjin University, China. The benchmark dataset consists of 400 video clips formed by 265,228 frames and 10,209 static images, captured by various drone-mounted cameras, covering a wide range of aspects including location (taken from 14 different cities separated by thousands of kilometers in China), environment (urban and country), objects (pedestrian, vehicles, bicycles, etc.), and density (sparse and crowded scenes). Note that, the dataset was collected using various drone platforms (i.e., drones with different models), in different scenarios, and under various weather and lighting conditions. These frames are manually annotated with more than 2.6 million bounding boxes or points of targets of frequent interests, such as pedestrians, cars, bicycles, and tricycles. Some important attributes including scene visibility, object class and occlusion, are also provided for better data utilization.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
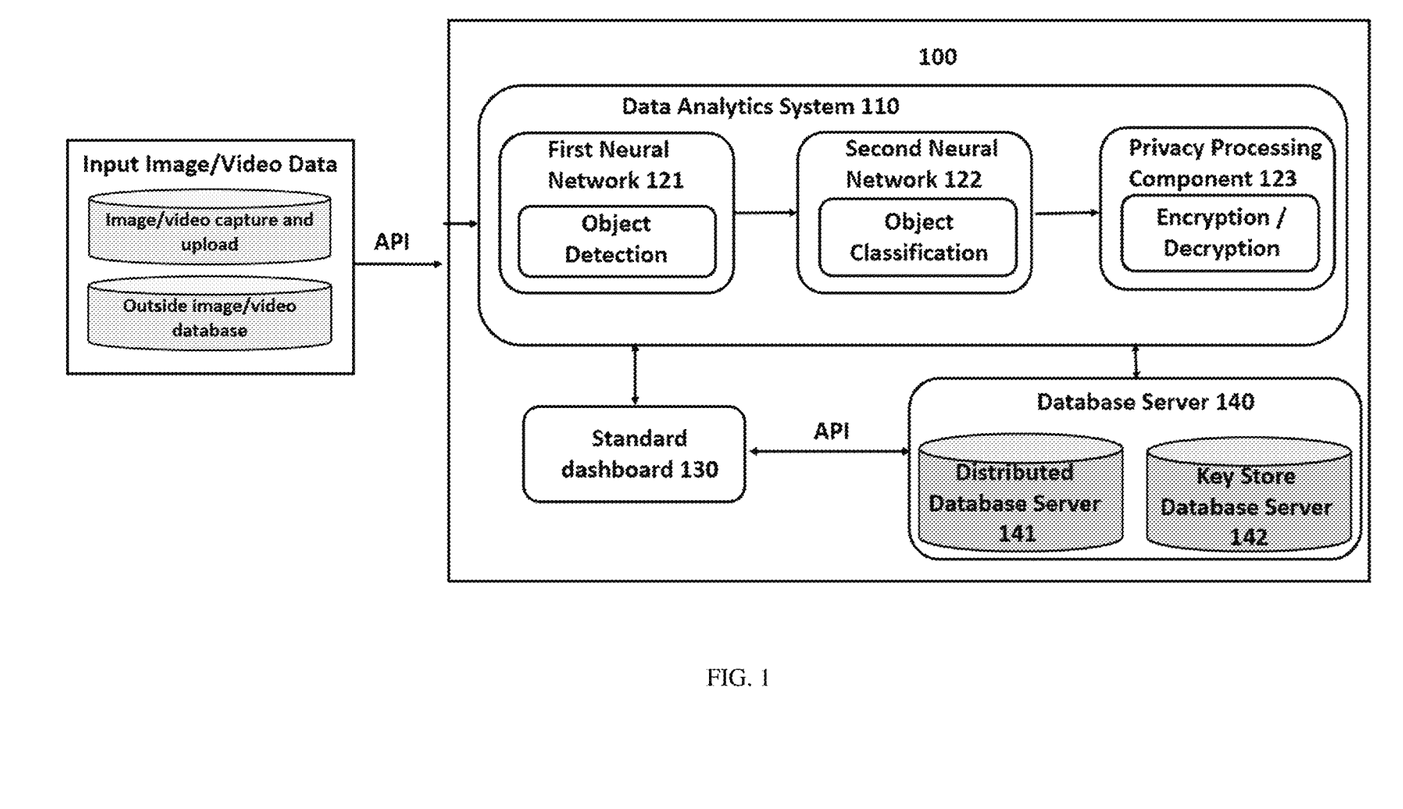
FIG. 1 depicts the components of the system for detecting object regions in an image or video and encrypting/decrypting detected regions.

FIG. 1 depicts an exemplary system for detecting the object region in an image and for encrypting/decrypting the detected object region. The system 100 comprises three main components: a data analytics system 110, a standard dashboard 130, a database server 140. The database server 140 may further comprises a distributed database server 141 and a key store database server 142. Database server 140 is configured to store real-time images. Distributed database server 141 is configured to store encrypted images. Key store database server 142 is configured to store the encrypted AES key. Data analytics system 110 is executed by a computer processor configured to apply deep learning algorithms to detect the object region captured by the image. Standard dashboard 130 is configured to communicate with the data analytics system 110 and the database server 140 to allow a user to encrypt an image or decrypt the encrypted image data using the secure keys.

The present invention uses microservice API infrastructure to allow real time data processing. In a microservice environment, a real time API proxy makes it easy to listen for instant updates from other micro services without the need for a centralized message broker. Each microservice gets its own proxy instance, and microservices communicate with each other via an organization's own API contracts rather than a vendor-specific mechanism.

Data analytics system 110, standard dashboard 130, distributed database server 140, and database server 140 may be any type of computer device, including but not limited to a personal computer, a server computer, a series of server computers, a mini computer, and a mainframe computer, or combinations thereof. Data analytics system 110, standard dashboard 130, database server 140 may be each a web server (or a series of servers) running a network operating system. Database server 140 may connects to one or more external data sources, including real-time camera capturing images, through one or more networks, including but not limited to, local-area networks (LANs), wide-area networks (WANs), world wide web (WWW), or any combination thereof.

Data analytics system 110 may comprise two neural networks 121 and 122. The first neural network 121 comprises an object detection module and the second neural network 122 comprises an object classification module. The data analytics system may contain more than two neural networks arranged in a sequence, wherein an output generated by a neural network may be fed into the subsequent neural network.

In general, the object detection is achieved based on convolutional neural networks (CNNs). To this end, the data analytics system 110 is trained using the training data stored in the database server 140 or from external database. The training data includes a plurality of training images. For example, the data analytics system 110 may be pretrained on the COCO dataset which mostly has images captured from the viewpoint of humans. To obtain a better generalization for the task at hand, the data analytics system 110 may be pretrained with Visdrone dataset which contains images captures from using drones and hence would impart an object detector information about the world from the viewpoint of a flying drone.

The data analytics system 110 further comprises a privacy processing component 123 for encrypting and decrypting the detected object region using AES-CBC. AES is a symmetric key block cipher. The AES is a Non Feistel cipher that encrypts and decrypt a data block of 128 bits. It may support three different key lengths of size 128, 198, 256 bits. The algorithm works on 4×4 matrix of bytes. AES consists of four major transformation functions: Sub bytes, Shift Rows, Mix columns and Add Round Key. The final round consists of three transformations. The Mix columns functions are not used in the final round. Each transformation takes one or more 4×4 matrices as input and it produces a 4×4 matrix as output. Above four rounds are reversible, it is easy to prove that decryption does recover the plain text or image. The characteristics of AES algorithms achieve higher encryption speed than any other cryptographic algorithms, safer and more secure encryption scheme, the block size is increased to 128 bits.

The image with detected object region to be encrypted is transmitted to the privacy processing component 123. An AES key generator may randomly generate an AES key. This key is used to encrypt the image using AES algorithm with the help of CBC (Cipher Block Chaining) method. The encryption is done block by block meaning each block is encrypted separately for the entire image from the very first block through the last block. The first block is encrypted with a key and an initialization vector (IV) using the AES-128 algorithm thereby generating a cipher block. Now using this cipher block and the key provided, the next block is encrypted and the subsequent cipher block is generated.

This procedure is followed for all the blocks until the last block is encrypted. The output is a block encrypted image (Cipher Image).

Cipher block chaining mode is a technique used to encode and decode the information which is applied on a chunk of data. In CBC mode each plaintext block is exclusive or with the previous cipher text block before being encrypted. When a block is enciphered, the block is sent, but a copy of it is kept in memory to be used in the encryption of the next block.

A specific secure gateway/API in the standard dashboard 130 will be enabled to decrypt the encrypted image data stored in the distributed database server 141 using the secure keys upon receiving request from the user. For AES decryption, the same encryption process occurs simply in reverse order. The encryption parameters are the input cipher text, the key and the output plaintext should be same as encryption input. The first block is decrypted using the decryption key and then the same initialization vector is used to retrieve the first block of the original secret image. The same process follows for the subsequent cipher blocks with the previous cipher block being used instead of the initialization vector and resulting into the corresponding blocks of the secret image. This process is followed until the last block is decrypted thereby finalizing the entire decryption process. The original image is now decrypted and retrieved safely.

The image that is recovered after decryption is of the same dimension and size. The quality of the image is not lost at all i.e. the image chosen for encryption and the image retrieved after decryption are digitally same.

The relation between plaintext and ciphertext blocks is shown below, where E is the Encryption, Pi is the $i^{th}$ plain text block i, K is Secret key, D is Decryption, Ci is the $i^{th}$ Cipher text block i, IV is the Initial vector.

Encryption: $C_0=IV$,
$C_i=E_K(P_i \text{ XOR } C_{i-1})$,
Decryption: $C_0=IV$,
$P_i=D_K(Ci) \text{ XOR } C_{i-1}$.

CBC mode is as secure against standard attacks. CBC overcomes the security deficiency of the other mode. It is more difficult for a cryptanalyst to break the code using strategies that look for patterns in the cipher text, patterns that may correspond to the known structure of the plaintext. With this chaining scheme, the cipher text block for any given plaintext block becomes a function of all the previous cipher text blocks.

Figure 2:
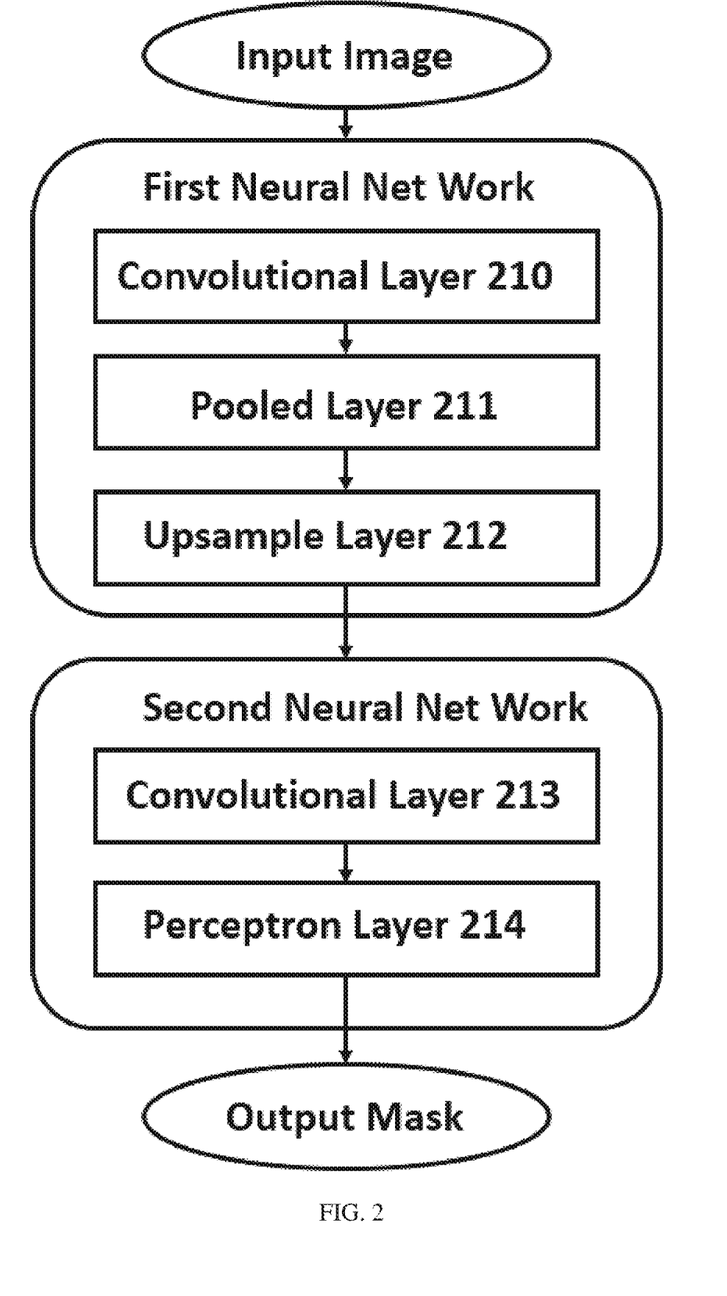
FIG. 2 shows a block diagram of the convolutional neural networks.

FIG. 2 shows a block diagram of the convolutional neural networks in accordance with example implementations of the subject matter described herein. The data analytics system 110 may comprise two sequential neural networks. The first neural network extracts the object features from the image, highlights or enhance the quality of images to refine results and send it to a second neural network. The first neural network uses a hybrid neural network model that combine convolutional neural network (CNN) and multi-layer perceptron (MLP) architecture.

The first neural network comprises a convolutional layer 210 for performing convolution filtering on the input image. As used herein, a "layer" refers to one or more modules or logic for performing specific operations. The convolutional layer 210 includes a plurality of the convolution filters. The convolution filters in the first convolutional layer apply convolution filters or feature detectors to the input image to generate the feature maps. Feature detectors or filters help identify different features present in an image like edges, vertical lines, horizontal lines, bends, etc. The feature maps record the strength and spatial locations of the responses of the filters on the respective channels. The number of channels is defined by the number of the convolution filters in the convolutional layer.

The feature map of each channel includes activations that record the semantic information for the respective regions in the image. More particularly, the semantic information is indicated by the strength of activations and each activation in the convolutional feature maps is contributed by a receptive field in the image domain.

The first neural network further comprises a pooling layer 211. The pooling layer 211 applies pooling over the feature maps for invariance to translation. Pooling is based on the concept that when the input is changed by a small amount, the pooled outputs do not change. Several pooling techniques may be used, including but not limited to min pooling, average pooling, or max pooling. Max pooling provides better performance compared to min or average pooling. In addition, the spatial pooling combines the responses of features obtained at nearby locations into some statistic that summarizes the joint distribution of the feature over the region of interests. By means of pooling, the features (in terms of its bounding box) are adapted to a fixed-length output. Any suitable pooling technologies, either currently known or to be developed in the future, can be used. By way of example, in one implementation, the pooling layer 211 may apply spatial pyramid pooling (SPP).

The pooled features may be fed a upsample layer 212 to perform a backwards convolutional operation to enhance the dimensions of the input to perform a backwards convolutional operation to enhance the dimensions of the input.

The upsample layer 212 is fed into a second convolutional layer 213 in the second neural network. The second convolutional layer 213 produces further feature maps. The output of the second convolutional layer 213 may be fed to a multi-head self-supervised learning-based classification module of the second neural network. The multi-head self-supervised learning-based classifier classifies the objects in image according to object features. The second neural network classifiers enable calculation or processing of quantitative measures of the object regions.

In another embodiment, the output of the second convolutional layer 213 is fed to into a perceptron layer 214. The perceptron layer 214 is suitable for classification prediction problems where inputs are assigned a class or label. The perceptron layer 214 are also suitable for regression prediction problems where a real-valued quantity is predicted given a set of inputs.

Figure 3:
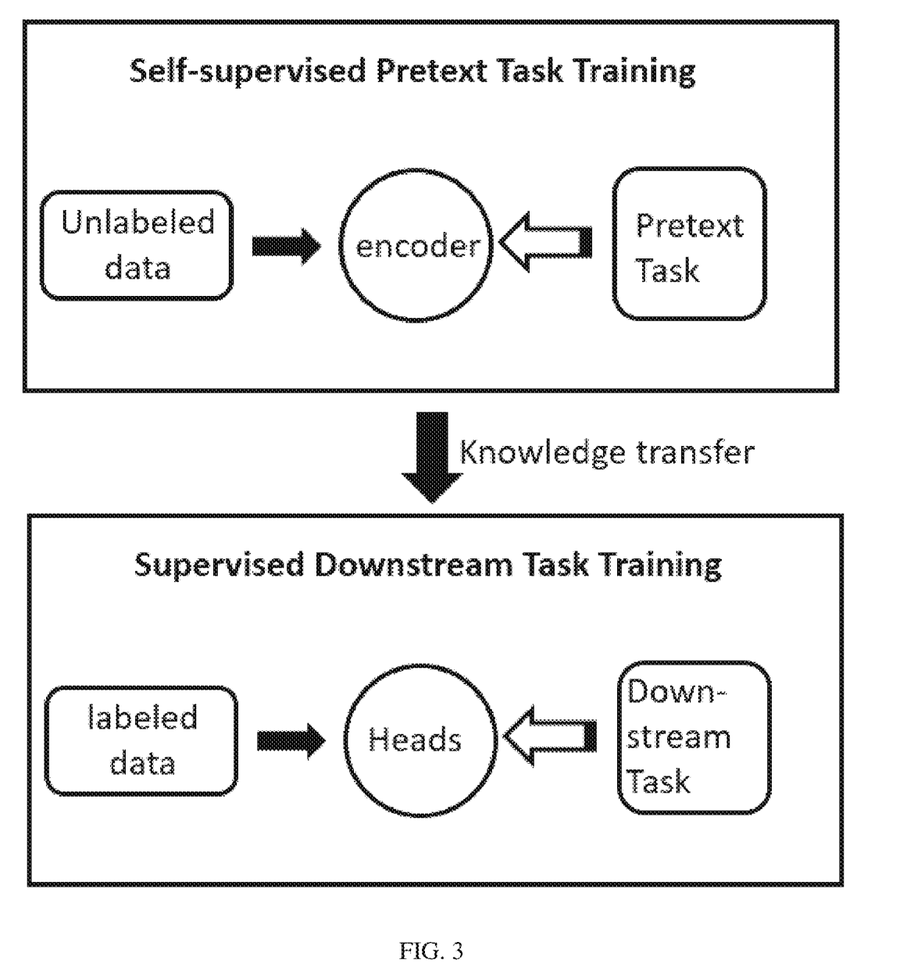
FIG. 3 illustrates an example of multi-head self-supervised learning-based classifier.

FIG. 3 illustrates a self-supervised learning pipeline. During the self-supervised training phase, a predefined pretext task is designed for the encoder to solve, and the pseudo labels for the pretext task are automatically generated based on some attributes of data. Then the encoder network is trained with a plurality of unlabeled data to learn object functions of the pretext task. After the self-supervised training finished, the learned visual features can be further transferred to different projection heads for downstream tasks as pretrained models to improve performance and overcome overfitting. Generally, shallow layers capture general low-level features like edges, corners, and textures while deeper layers capture task related high-level features. Therefore, visual features from only the first several layers are transferred during the supervised downstream task training phase.

In some embodiments, a pretext task is defined for an encoder network to solve and visual features can be learned through the process of accomplishing this pretext task. The pseudo labels for pretext task can be automatically generated without human annotations. The encoder network is optimized by minimizing the error between the prediction of output and the pseudo labels. The quality of this prediction is then evaluated using a contrastive loss. Contrastive loss takes the output of the encoder network for a positive example and calculates its distance to an example of the same class and contrasts that with the distance to negative examples. The loss is low if positive samples are encoded to similar (closer) representations and negative examples are encoded to different (farther) representations. To adapt contrastive loss to self-supervised learning, the encoder network is pre-trained using contrastive loss to embed samples guided by their labels. Then the encoder weights are frozen so that they are constant. Then a projection head is attached to the encoder output and is trained on labelled data to produce a final representation.

The projection head may be a multilayer perceptron (MLP). Multiple projection heads may be attached to the encoder and are trained for a specific task. Each projection head would not communicate with each other. At least one projection head is trained to classify a base object feature into its categories, for example, a human object or non-human object. A plurality of projection heads is trained to classify sub-object feature, including but not limited to gender (male or female), ages (child or adult) or the color of the clothes, corresponding to each of the base feature. To perform various sub-object feature classification, the projection head corresponding to their base feature would be replaced. Once the network is trained, the projection head can be discarded. The encoder network and final representations may be used to learn new downstream tasks. As the projection heads have a smaller number of parameters and are easily replaceable, the present system is much more memory and time efficient.

In some embodiments, context-based pretext tasks have been designed and applied for self-supervised learning. The design of context-based pretext tasks mainly employs the context features of images or videos such as context similarity, spatial structure, temporal structure, etc. In context similarity, pretext tasks are designed based on the context similarity between image patches. This type of methods includes image clustering-based methods and graph constraint-based methods. In spatial context structure, pretext tasks are based on the spatial relations among image patches. This type of methods includes image jigsaw puzzle, context prediction, and geometric transformation recognition, etc. In temporal context structure, the temporal order from videos is used as supervision signal. The encoder is trained to verify whether the input frame sequence in correct order or to recognize the order of the frame sequence.

Figure 4:
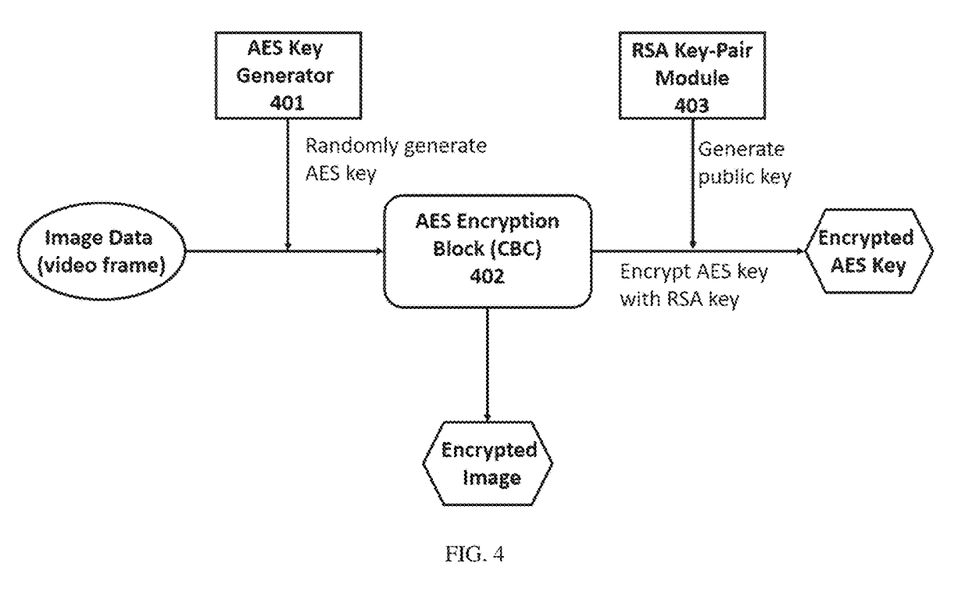
FIG. 4 illustrates an exemplary encryption algorithm block.

FIG. 4 illustrates an exemplary encryption algorithm block employed by the privacy processing component. The privacy processing component comprises an AES key generator 401, an AES encryption block 402, and a Rivest-Shamir-Adleman (RSA) key-pair module 403. The AES key generator 401 is configured to generate a random AES key. The AES encryption block 402 takes an image with the detected object and the AES key and then produces 256-bits of encrypted image output. The RSA key-pair module 403 is configured to generate a public key that is used to encrypt the AES key.

Figure 5:
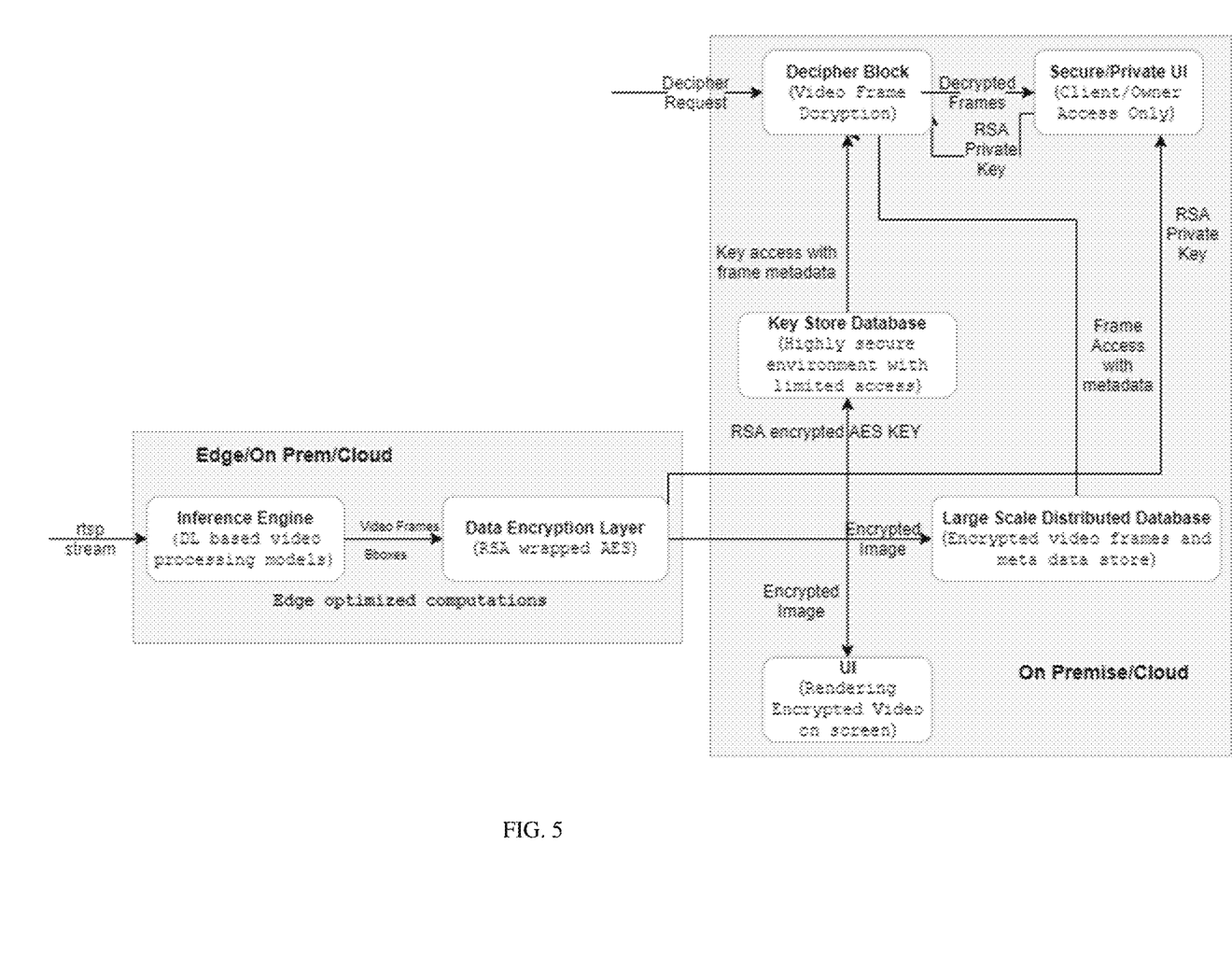
FIG. 5 illustrates an exemplary privacy preservation for surveillance systems.

FIG. 5 illustrates an exemplary privacy preservation flowchart for encryption and decryption. The data analytics system including the deep-learning based objection detection and classification component and privacy processing component may be installed and runs on computers on the premises of an end user. Alternatively, the data analytics system may be installed at a remote facility such as a server farm or cloud. The data analytics system is configured to receive streaming data in real time or batch mode from imaging devices or other external database. The data analytics system is configured to detect an object region with specific features to be encrypted and encrypt the object region with an AES key. The encrypted data is transmitted and stored in a large scale distributed database server so that even in the incidents like thievery or hacking individual privacy would not be compromised. The AES key is also encrypted with a RSA public key generated by a RSA key-pair module. The encrypted AES key is transmitted and stored in a key store database with limited access. The privacy processing component further comprises a decipher block configured to receive decipher request and to decrypt the encrypted data using the same AES key. The RSA key-pair module is configured to generate a private key for AES key recovery. The encrypted data stored in the database will be unmasked and will only be visible for a session with predefined expiry timelines.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A system for detecting an object region in an image and encrypting and decrypting a detected object region, comprising:
   a database server system configured to store real-time images, the database server system including a distributed database server configured to store encrypted images and a key store database server configured to store an encrypted advanced encryption standard (AES) key, wherein the database server system encrypts images or decrypts encrypted images using the encrypted AES key;
   a data analytics system executed by a computer processor configured to apply a multi-head self-supervised learning-based classifier, the data analytics system comprising a first neural network, a second neural network having a convolutional layer that produces an output that is fed to the multi-head self-supervised learning-based classifier that classifies objects in the image according to object features, and a privacy processing component, the data analytics system configured to apply deep learning to detect the object region captured by the image, the privacy component configured to encrypt and decrypt the detected object region using an advanced encryption standard with cipher block chaining mode (AES-CBC); and
   a standard dashboard configured to communicate with the data analytics system and the database server system;
   wherein the data analytics system performs at least one operation from the group consisting of:
      receiving an input unlabeled image, via an application programming interface from a recording device or an external database, wherein the application programming interface is microservice based with a real time API proxy where each microservice gets its own proxy instance, thereby providing real-time data processing;
      generating, via an augmentation module of the data analytics system, an augmented unlabeled image;

training an encoder neural network of the data analytics system with the augmented unlabeled image to extract object features and generate an output labeled image that labels the object region;

training a plurality of projection heads with the output labeled image to map features to a space where contrastive loss is applied and to classify the detected object region to be a human object region or a non-human object region;

designating the human object region with pre-defined features to be encrypted;

generating, via an advanced encryption standard (AES) key generator, an AES key;

encrypting, via an AES encryption block, a designated human object region using the AES key;

generating, via a Rivest-Shamir-Adleman (RSA) key-pair module, a public RSA key;

encrypting, via the RSA key-pair module, the AES key with the RSA public key;

outputting the encrypted image and storing the encrypted image in the large scale distributed database server;

outputting the encrypted AES key and storing the encrypted AES key in the key store database server; and decrypting, via a decipher block, the encrypted image upon receiving a request from a user.

2. The system of claim 1, wherein the privacy processing component is configured to encrypt the designated object region following an advanced encryption standard with cipher block chaining mode.

3. The system of claim 1, wherein the privacy processing component is configured to encrypt an image of a plurality of designated object regions to be encrypted individually using a plurality of encryption keys.

4. The system of claim 1, wherein the privacy processing component is configured to encrypt an image of a plurality of designated object regions to be encrypted using one encryption key.

5. The system of claim 1, wherein the neural network comprises a hybrid neural network model consisting of convolutional neural network and multilayer perceptron architecture.

6. The system of claim 1, wherein the projection head comprises multilayer perceptron architecture.

7. The system of claim 1, wherein the neural network is trained on self-supervised contrastive loss.

8. The system of claim 1, wherein encoder weights are frozen after training.

9. A method for detecting an object region in an image and encrypting and decrypting a detected object region, comprising:

receiving an input unlabeled image, via application programming interface from a recording device or an external database, wherein the application programming interface is microservice based with a real time API proxy where each microservice gets its own proxy instance, thereby providing real-time data processing;

generating, via an augmentation module of a data analytics system, an augmented unlabeled image, the data analytics system comprising a first neural network, a second neural network having a convolutional layer that produces an output that is fed to a multi-head self-supervised learning-based classifier that classifies objects in the image according to object features, and a privacy processing component, the data analytics system configured to apply deep learning to detect the object region captured by the image, the privacy component configured to encrypt and decrypt the detected object region using an advanced encryption standard with cipher block chaining mode (AES-CBC);

training an encoder neural network of the data analytics system with the augmented unlabeled image to extract object features and generate an output labeled image that labels the object region;

training a plurality of projection heads with the output labeled image to map features to a space where contrastive loss is applied and perform classification and to classify the detected object region to be a human object region or a non-human object region;

designating the human object region with pre-defined features to be encrypted;

generating, via an advanced encryption standard (AES) key generator, an AES key;

encrypting, via an AES encryption block, a designated human object region using the AES key;

generating, via a Rivest-Shamir-Adleman (RSA) key-pair module, a public RSA key;

encrypting, via the RSA key-pair module, the AES key with the RSA public key;

outputting an encrypted image and storing the encrypted image in a distributed database server;

outputting an encrypted AES key and storing the encrypted AES key in a key store database server, wherein the distributed database server and the key store database server are in a database server system configured to store real-time images, the database server system including the distributed database server configured to store encrypted images and the key store database server configured to store an encrypted advanced encryption standard (AES) key, wherein the database server system encrypts images or decrypts encrypted images using the encrypted AES key; and decrypting, via a decipher block, the encrypted image upon receiving a request from a user.

10. The method of claim 9, wherein the privacy processing component is configured to encrypt the designated object region following an advanced encryption standard with cipher block chaining mode.

11. The method of claim 9, wherein the privacy processing component is configured to encrypt an image of a plurality of designated object regions to be encrypted individually using a plurality of encryption keys.

12. The method of claim 9, wherein the privacy processing component is configured to encrypt an image of a plurality of designated object regions to be encrypted using one encryption key.

13. The method of claim 9, wherein the neural network comprises a hybrid neural network model consisting of convolutional neural network and multilayer perceptron architecture.

14. The method of claim 9, wherein the projection head comprises multilayer perceptron architecture.

15. The method of claim 9, wherein the neural network is trained on self-supervised contrastive loss.

16. The method of claim 9, wherein encoder weights are frozen after training.

* * * * *